United States Patent
Oribe et al.

(10) Patent No.: US 10,464,287 B2
(45) Date of Patent: Nov. 5, 2019

(54) POROUS PLATE-SHAPED FILLER, METHOD FOR PRODUCING SAME, AND HEAT INSULATION FILM

(71) Applicant: NGK INSULATORS, LTD., Nagoya (JP)

(72) Inventors: Akinobu Oribe, Nagoya (JP); Takahiro Tomita, Nagoya (JP); Hiroharu Kobayashi, Nagoya (JP)

(73) Assignee: NKG Insulators, Ltd., Nagoya (JP)

( * ) Notice: Subject to any disclaimer, the term of this patent is extended or adjusted under 35 U.S.C. 154(b) by 129 days.

(21) Appl. No.: 15/297,429

(22) Filed: Oct. 19, 2016

(65) Prior Publication Data
US 2017/0036303 A1    Feb. 9, 2017

Related U.S. Application Data

(63) Continuation of application No. PCT/JP2015/061784, filed on Apr. 17, 2015.

(30) Foreign Application Priority Data

Apr. 23, 2014   (JP) .................................. 2014-089249

(51) Int. Cl.
  *B32B 5/30*   (2006.01)
  *C08K 7/24*   (2006.01)
  (Continued)

(52) U.S. Cl.
  CPC ............ *B32B 5/30* (2013.01); *B23K 26/0624* (2015.10); *B23K 26/38* (2013.01); *B26D 3/08* (2013.01);
  (Continued)

(58) Field of Classification Search
  CPC .... B32B 5/16; B32B 5/22; B32B 5/30; B32B 3/10; B32B 3/14; B32B 3/18; B32B 3/22;
  (Continued)

(56) References Cited

U.S. PATENT DOCUMENTS 2,704,105 A * 3/1955 Robinson ............... H01B 3/002
                                                       423/328.2
3,225,131 A * 12/1965 Conklin ................... H01B 7/02
                                                       162/138

(Continued)

FOREIGN PATENT DOCUMENTS

JP   62-232187 A1   10/1987
JP   04-317735 A1   11/1992

(Continued)

OTHER PUBLICATIONS

Machine translation of JP 2006/151799 A, obtained from J-PlatPat service of the JPO.*

(Continued)

*Primary Examiner* — Z. Jim Yang
(74) *Attorney, Agent, or Firm* — Burr & Brown, PLLC

(57) ABSTRACT

A porous plate-shaped filler of the present invention is a plate shape having an aspect ratio of 3 or more, a surface shape is one of a round shape, an oval and a round-corner polygonal shape, and its minimum length is from 0.1 to 50 μm. Furthermore, a sectional shape is one of an arch shape, an elliptic shape, and a quadrangular shape in which at least a part of corners is rounded. Consequently, it is possible to obtain the heat insulation film in which the porous plate-shaped fillers 1 are easy to be laminated and the heat insulation effect improves.

13 Claims, 10 Drawing Sheets

(51) Int. Cl.

| | |
|---|---|
| *C09D 7/40* | (2018.01) |
| *B32B 5/16* | (2006.01) |
| *B23K 26/38* | (2014.01) |
| *B26D 3/08* | (2006.01) |
| *C01G 25/02* | (2006.01) |
| *C04B 35/491* | (2006.01) |
| *C04B 38/06* | (2006.01) |
| *C04B 38/08* | (2006.01) |
| *C09D 1/00* | (2006.01) |
| *C08K 3/22* | (2006.01) |
| *C09D 201/00* | (2006.01) |
| *F16L 59/00* | (2006.01) |
| *B23K 26/0622* | (2014.01) |
| *C04B 35/486* | (2006.01) |
| *B23K 103/00* | (2006.01) |

(52) U.S. Cl.
CPC ............... *B32B 5/16* (2013.01); *C01G 25/02* (2013.01); *C04B 35/486* (2013.01); *C04B 35/491* (2013.01); *C04B 38/06* (2013.01); *C04B 38/08* (2013.01); *C08K 3/22* (2013.01); *C08K 7/24* (2013.01); *C09D 1/00* (2013.01); *C09D 7/40* (2018.01); *C09D 201/00* (2013.01); *F16L 59/00* (2013.01); *B23K 2103/50* (2018.08); *B23K 2103/52* (2018.08); *C01P 2004/20* (2013.01); *C01P 2004/22* (2013.01); *C08K 2201/016* (2013.01)

(58) Field of Classification Search
CPC ... C09K 3/1409–1445; Y10T 428/2982; Y10T 428/2991–2998; Y10T 428/16; Y10T 428/161; Y10T 428/162; Y10T 428/163–168; Y10T 428/17; Y10T 428/18–187
See application file for complete search history.

(56) References Cited

U.S. PATENT DOCUMENTS

| | | | | | |
|---|---|---|---|---|---|
| 4,660,861 | A | * | 4/1987 | Argy | F16L 59/029 285/45 |
| 4,913,966 | A | * | 4/1990 | Garvey | B01J 20/103 264/125 |
| 5,072,886 | A | * | 12/1991 | Morrison | B01J 23/04 241/1 |
| 5,164,348 | A | * | 11/1992 | Wood | C01F 7/02 501/1 |
| 5,167,988 | A | * | 12/1992 | Yano | C23D 3/00 428/324 |
| 5,665,810 | A | * | 9/1997 | Patchett | B29C 49/00 524/449 |
| 5,932,309 | A | * | 8/1999 | Smith | B32B 27/20 428/46 |
| 6,165,594 | A | * | 12/2000 | Moh | G09F 3/02 428/207 |
| 6,277,161 | B1 | * | 8/2001 | Castro | C04B 35/1115 451/28 |
| 7,514,145 | B2 | * | 4/2009 | Akioka | C08J 3/122 425/6 |
| 2003/0038278 | A1 | * | 2/2003 | Ishihara | H01L 23/15 252/500 |
| 2004/0052976 | A1 | * | 3/2004 | Buczek | B05D 1/40 427/598 |
| 2005/0208338 | A1 | * | 9/2005 | Fernie | C23C 30/00 428/701 |
| 2005/0287348 | A1 | * | 12/2005 | Faler | B32B 5/18 428/315.5 |
| 2006/0153769 | A1 | * | 7/2006 | Robinson | C01F 7/02 423/625 |
| 2006/0231201 | A1 | * | 10/2006 | Smith | B32B 5/16 156/307.3 |
| 2006/0257662 | A1 | * | 11/2006 | Bujard | C09C 1/0015 428/404 |
| 2007/0098803 | A1 | * | 5/2007 | Dobbs | A61K 9/14 424/489 |
| 2007/0259185 | A1 | * | 11/2007 | Hingst | B32B 18/00 428/408 |
| 2008/0058459 | A1 | * | 3/2008 | Brand | C08K 9/04 524/493 |
| 2008/0107856 | A1 | * | 5/2008 | Argoitia | C09C 1/0015 428/43 |
| 2008/0171811 | A1 | * | 7/2008 | Guiselin | B01J 21/04 523/216 |
| 2008/0280140 | A1 | * | 11/2008 | Ferrari | C25F 3/12 428/402 |
| 2009/0238982 | A1 | * | 9/2009 | Florent | C03C 17/007 427/387 |
| 2010/0055459 | A1 | * | 3/2010 | Desimone | B81C 99/0095 428/402 |
| 2010/0151195 | A1 | * | 6/2010 | Culler | B24D 11/00 428/142 |
| 2010/0151196 | A1 | * | 6/2010 | Adefris | C09K 3/1409 428/142 |
| 2010/0159329 | A1 | * | 6/2010 | Sugiura | H01M 4/131 429/231.4 |
| 2010/0266847 | A1 | * | 10/2010 | Wickert | B01J 20/28016 428/402 |
| 2010/0277872 | A1 | * | 11/2010 | Ito | H01L 23/3737 361/715 |
| 2011/0027549 | A1 | * | 2/2011 | Boutaghou | B24D 18/0054 428/206 |
| 2011/0040013 | A1 | * | 2/2011 | Tsapatsis | B01D 69/148 524/430 |
| 2011/0076480 | A1 | * | 3/2011 | Skoog | C04B 26/30 428/312.6 |
| 2011/0114870 | A1 | * | 5/2011 | Yang | C04B 26/10 252/62 |
| 2012/0028018 | A1 | * | 2/2012 | Cho | C03C 14/004 428/220 |
| 2012/0171438 | A1 | * | 7/2012 | Roberts, III | B82Y 30/00 428/206 |
| 2012/0189871 | A1 | * | 7/2012 | Hecht | F01D 5/288 428/697 |
| 2012/0216719 | A1 | * | 8/2012 | Hagar | C09D 7/00 106/636 |
| 2013/0180180 | A1 | * | 7/2013 | Yener | C09K 3/1436 51/309 |
| 2013/0203328 | A1 | * | 8/2013 | Givot | B24D 5/02 451/548 |
| 2013/0236725 | A1 | * | 9/2013 | Yener | C09K 3/1418 428/402 |
| 2013/0260139 | A1 | * | 10/2013 | Kamada | C03C 17/007 428/328 |
| 2013/0288055 | A1 | * | 10/2013 | Doshita | C01B 33/12 428/402 |
| 2013/0289133 | A1 | * | 10/2013 | Doshita | C01B 33/12 514/769 |
| 2013/0305618 | A1 | * | 11/2013 | Maezawa | C09K 3/1409 51/309 |
| 2014/0050925 | A1 | * | 2/2014 | Sueda | C01G 9/02 428/402 |
| 2014/0109490 | A1 | * | 4/2014 | Boden | C04B 35/10 51/309 |
| 2014/0212655 | A1 | * | 7/2014 | Matsuno | G02B 5/208 428/323 |
| 2014/0287658 | A1 | * | 9/2014 | Flaschberger | B24D 3/14 451/47 |
| 2014/0348559 | A1 | * | 11/2014 | Miyahara | G03G 15/2057 399/333 |
| 2015/0007399 | A1 | * | 1/2015 | Gonzales | A61K 8/25 15/104.93 |
| 2015/0010721 | A1 | * | 1/2015 | Tanida | H05K 5/0086 428/34.5 |
| 2015/0104626 | A1 | | 4/2015 | Tomita et al. | |

(56) References Cited

U.S. PATENT DOCUMENTS

| | | | | |
|---|---|---|---|---|
| 2015/0118482 A1* | 4/2015 | Kagawa | ............. | B32B 27/08 |
| | | | | 428/323 |
| 2015/0291865 A1* | 10/2015 | Breder | ............. | C09K 3/1409 |
| | | | | 51/309 |
| 2015/0315442 A1* | 11/2015 | Hofius | ............. | C09K 3/1427 |
| | | | | 51/308 |
| 2015/0329431 A1* | 11/2015 | Deville | ............. | C04B 35/111 |
| | | | | 428/188 |
| 2015/0353355 A1* | 12/2015 | Fukunaga | ............. | C04B 35/581 |
| | | | | 252/74 |
| 2016/0025035 A1* | 1/2016 | Kadoshima | ............. | F16J 1/01 |
| | | | | 252/62 |
| 2016/0185074 A1* | 6/2016 | Kagawa | ............. | H01L 23/3737 |
| | | | | 428/341 |
| 2016/0258383 A1 | 9/2016 | Kobayashi et al. | | |

FOREIGN PATENT DOCUMENTS

| | | | |
|---|---|---|---|
| JP | 06-114257 A1 | 4/1994 | |
| JP | 08-252450 A1 | 10/1996 | |
| JP | 2005-137955 A1 | 6/2005 | |
| JP | 2006151799 A * | 6/2006 | |
| JP | 2006-278761 A1 | 10/2006 | |
| JP | 2010-073711 A1 | 4/2010 | |
| JP | 2015-093075 A1 | 5/2015 | |
| WO | 2010/018675 A1 | 2/2010 | |
| WO | WO 2012096171 A1 * | 7/2012 | ............. C01B 33/12 |
| WO | 2013/191263 A1 | 12/2013 | |
| WO | WO 2014123247 A1 * | 8/2014 | ............. C04B 35/581 |
| WO | 2015/076098 A1 | 5/2015 | |
| WO | 2015/076176 A1 | 5/2015 | |
| WO | 2015/076317 A1 | 5/2015 | |
| WO | 2015/087887 A1 | 6/2015 | |
| WO | 2015/087888 A1 | 6/2015 | |

OTHER PUBLICATIONS

Definition of the term "contiguous" from the Oxford English Dictionary, retrieved May 2018.*
Definition of the term "contiguous" from Merriam-Webster Dictionary, retrieved May 2018.*
Definition of the term "contiguous" from MacMillan Dictionary, retrieved May 2018.*
Extended European Search Report, European Application No. 15783810.3, dated Nov. 30, 2017 (6 pages).
International Search Report and Written Opinion (Application No. PCT/JP2015/061784) dated Jul. 14, 2015.

* cited by examiner

POROUS PLATE-SHAPED FILLER, METHOD FOR PRODUCING SAME, AND HEAT INSULATION FILM

BACKGROUND OF THE INVENTION

1. Field of the Invention

The present invention relates to a porous plate-shaped filler to form a heat insulation film in which a heat insulation effect improves, a method for producing the same, and a heat insulation film using the porous plate-shaped filler.

2. Description of Related Art

As a heat insulation film formed on the surface of an article to improve a heat insulation effect and flame retardance of the article, there is known a film in which porous plate-shaped fillers having a low thermal conductivity are arranged in the form of layers in a matrix made of a resin or the like. Patent Document 1 discloses, as fillers to be included in a heat insulation film, porous plate-shaped fillers which are plates having an aspect ratio of 3 or more, a minimum length of 0.1 to 50 μm and a porosity of 20 to 99%. In the heat insulation film using the porous plate-shaped fillers, a length of a heat insulation route increases and a thermal conductivity can decrease as compared with a case of using spherical or cubic fillers. Consequently, even a thin heat insulation film has a heat insulation effect higher than before. Furthermore, a mutual bonding area of the porous plate-shaped fillers via the matrix increases as compared with the case of using the spherical filler or the like, and hence strength can improve.

Furthermore, Patent Document 1 discloses, as a method for producing the porous plate-shaped filler, a method of firing a green sheet made from a material including ceramics powder and suitably grinding the fired green sheet. Furthermore, as another producing method, there is also disclosed a method of performing processing such as cutting or punching of the green sheet prior to the firing into a predetermined surface shape, and firing the green sheet to produce the porous thin plate-shaped filler without performing the grinding after the firing.

CITATION LIST

Patent Documents

[Patent Document 1] WO 2013/191263

SUMMARY OF THE INVENTION

Problem to be Solved by the Invention

However, when porous plate-shaped fillers obtained by firing a green sheet and then grinding a sheet-shaped fired body are used as components of a heat insulation film, the porous plate-shaped fillers might be hard to be arranged (laminated) in the form of layers in the heat insulation film, and a heat insulation effect might not sufficiently be obtained, depending on their shapes.

The present invention has been developed in view of such conventional situations, and one of its objects is to provide porous plate-shaped fillers which are easy to be laminated in a heat insulation film. Furthermore, another object of the present invention is to provide a method for producing such a porous plate-shaped filler. Furthermore, still another object of the present invention is to provide a heat insulation film which includes the porous plate-shaped fillers and in which a heat insulation effect improves.

Means for Solving the Problem

The present inventors have found that a porous plate-shaped filler is a plate shape having an aspect ratio of 3 or more, and a surface shape is one of a round shape, an oval, and a round-corner polygonal shape, thereby making it possible to achieve the above object. Further, according to the present invention, there are provided a porous plate-shaped filler, a method for producing the porous plate-shaped filler, and a heat insulation film.

According to a first aspect of the present invention, a porous plate-shaped filler is provided which is a plate shape having an aspect ratio of 3 or more and in which a surface shape is one of a round shape, an oval, and a round-corner polygonal shape and a minimum length is from 0.1 to 50 μm.

According to a second aspect of the present invention, the porous plate-shaped filler according to the above first aspect is provided, wherein a radius R of an arc of the round-corner polygonal shape in the surface shape is not less than the minimum length.

According to a third aspect of the present invention, the porous plate-shaped filler according to the above first or second aspects is provided, wherein a sectional shape is one of an arch shape, an elliptic shape, and a quadrangular shape in which at least a part of corners is rounded.

According to a fourth aspect of the present invention, the porous plate-shaped filler according to the above third aspect is provided, wherein a radius R of an arc of the quadrangular shape in which the at least a part of corners in the sectional shape is rounded is $\frac{1}{5}$ or more of the minimum length.

According to a fifth aspect of the present invention, the porous plate-shaped filler according to any one of the above first to fourth aspects is provided, which includes pores having an average pore diameter of 10 to 500 nm.

According to a sixth aspect of the present invention, the porous plate-shaped filler according to any one of the above first to fifth aspects is provided, wherein a thermal conductivity is 1 W/(m·K) or less.

According to a seventh aspect of the present invention, the porous plate-shaped filler according to any one of the above first to sixth aspects is provided, wherein a heat capacity is from 10 to 3000 kJ/(m³·K) or less.

According to an eighth aspect of the present invention, a method for producing the porous plate-shaped filler according to any one of the above first to seventh aspects is provided, which includes processing a green sheet made from a material including a component of the porous plate-shaped filler by use of a laser processing machine capable of performing irradiation with laser at a pulse width of 10 picoseconds or less, before or after firing, to form the porous plate-shaped filler having a predetermined surface shape.

According to a ninth aspect of the present invention, a method for producing the porous plate-shaped filler according to any one of the above first to seventh aspects is provided, which includes dropping or discharging slurry made from a material including a component of the porous plate-shaped filler and adjusted into a viscosity of 100 to 10000 cps, to form the porous plate-shaped filler whose sectional shape is one of an arch shape, an elliptic shape, and a quadrangular shape in which at least a part of corners is rounded.

According to a tenth aspect of the present invention, the method for producing the porous plate-shaped filler according to the above ninth aspect is provided, which includes dropping or discharging the slurry by use of an ink jet type spotter device.

According to an eleventh aspect of the present invention, a method for producing the porous plate-shaped filler according to any one of the above first to seventh aspects is provided, which includes adhering, to an adhering portion having a predetermined shape, slurry made from a material including a component of the porous plate-shaped filler and adjusted into a viscosity of 100 to 10000 cps; and pressing the adhering portion onto a substrate surface, thereby adhering the slurry adhered to the adhering portion to the substrate surface, to form the porous plate-shaped filler whose sectional shape is one of an arch shape, an elliptic shape, and a quadrangular shape in which at least a part of corners is rounded.

According to a twelfth aspect of the present invention, the method for producing the porous plate-shaped filler according to the above eleventh aspect is provided, which includes adhering the slurry to the substrate surface by use of a needle type dispenser device.

According to a thirteenth aspect of the present invention, a heat insulation film which includes the porous plate-shaped filler according to any one of the above first to seventh aspects is provided.

According to a fourteenth aspect of the present invention, the heat insulation film according to the above thirteenth aspect is provided, wherein the porous plate-shaped fillers are arranged in the form of layers.

According to a fifteenth aspect of the present invention, the heat insulation film according to the above thirteenth or fourteenth aspects is provided, wherein a thickness is from 1 µm to 5 mm.

According to a sixteenth aspect of the present invention, the heat insulation film according to any one of the above thirteenth to fifteenth aspects is provided, wherein a thermal conductivity is 1 W/(m·K) or less.

Effect of the Invention

A porous plate-shaped filler (hereinafter also referred to as the filler) of the present invention is a porous plate-shaped filler which is a plate shape having an aspect ratio of 3 or more and in which a surface shape is one of a round shape, an oval and a round-corner polygonal shape and a minimum length is from 0.1 to 50 µm. Consequently, in a case of including the porous plate-shaped fillers of the present invention in a heat insulation film and when superimposing the fillers on one another, the fillers mutually slip, and therefore easily become horizontal, as compared with porous plate-shaped fillers which are polygonal and have edges. Therefore, the fillers are easy to be arranged (laminated) in the form of the layers, and brings a high heat insulation effect to the heat insulation film. Furthermore, it is preferable that a sectional shape of the porous plate-shaped filler of the present invention is one of an arch shape, an elliptic shape, and a quadrangular shape in which at least a part of corners is rounded, and when the fillers are superimposed on one another during the forming of the heat insulation film, the fillers more easily slip mutually, become nearly horizontal and are easy to be laminated. In the heat insulation film including the porous plate-shaped fillers, a portion in which any porous plate-shaped fillers are not arranged becomes a heat transfer path, and hence in the heat insulation film in which the fillers become nearly horizontal to be laminated on one another, the heat transfer path lengthens, and the heat insulation effect improves. Furthermore, in the porous plate-shaped filler of the shape of the present invention, even when there is a distribution in lengths of a maximum length and the minimum length, the fillers included in the heat insulation film are easy to be laminated, and therefore bring the high heat insulation effect.

Furthermore, a method for producing the porous plate-shaped filler of the present invention is a producing method to form the porous plate-shaped filler by processing a green sheet made from a material including a component of the porous plate-shaped filler with a laser processing machine capable of performing irradiation with laser at a pulse width of 10 picoseconds or less, before or after firing. In this method, shape and size of the surface shape of the filler are freely changeable depending on a position to be irradiated with the laser. As another producing method, there is a producing method to form a porous plate-shaped filler by dripping or discharging slurry made from a material including a component of the porous plate-shaped filler and adjusted into a viscosity of 100 to 10000 cps. In this method, the surface shape which is formable at one discharging time is round or elliptic, but when discharging the slurry a plurality of times, it is possible to form fillers of various shapes. As still another producing method, there is a producing method of adhering, to an adhering portion having a predetermined shape, slurry made from a material including a component of the porous plate-shaped filler and adjusted into a viscosity of 100 to 10000 cps, and pressing the adhering portion onto a substrate surface to adhere the slurry to the substrate surface, thereby forming the porous plate-shaped filler. In this method, the shape and size of the surface shape of the filler are freely changeable depending on a shape of an adhering tip portion.

Furthermore, a heat insulation film of the present invention includes such a porous plate-shaped filler of the present invention as described above, and hence in the heat insulation film, the porous plate-shaped fillers are easy to be arranged (laminated) in the form of layers, and as a result, a thermal conductivity sufficiently decreases, and the film exerts a heat insulation effect.

DETAILED DESCRIPTION OF THE INVENTION

Hereinafter, embodiments of the present invention will be described with reference to the drawings. The present invention is not limited to the following embodiments, and changes, modifications and improvements can be added without departing from the gist of the invention.

1. Porous Plate-Shaped Filler

Figure 1:
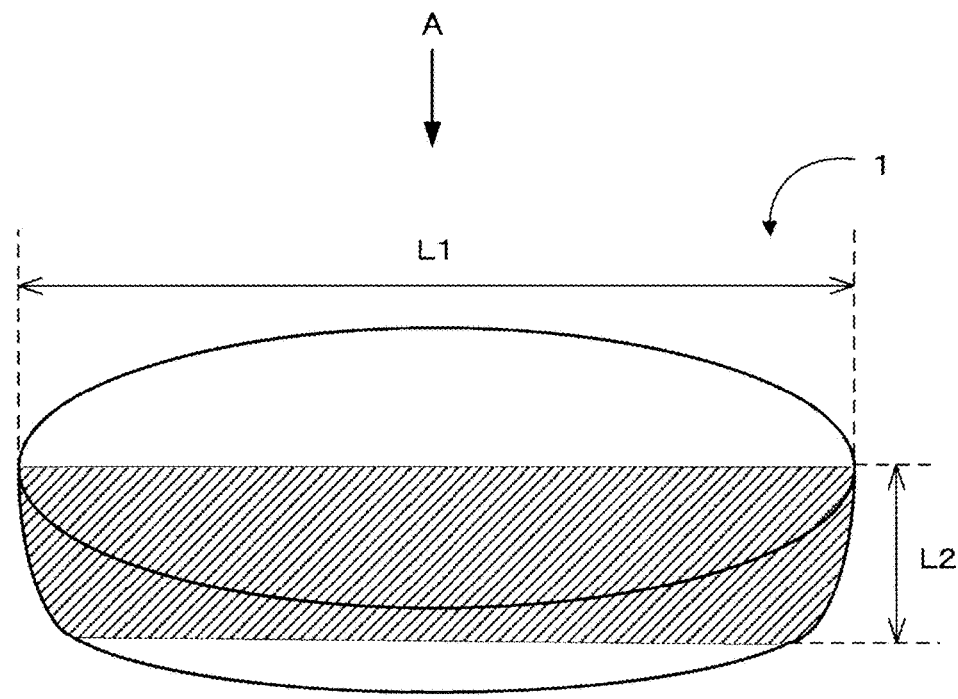
FIG. 1 is a perspective view schematically showing one example of a porous plate-shaped filler of the present invention.
Figure 2:
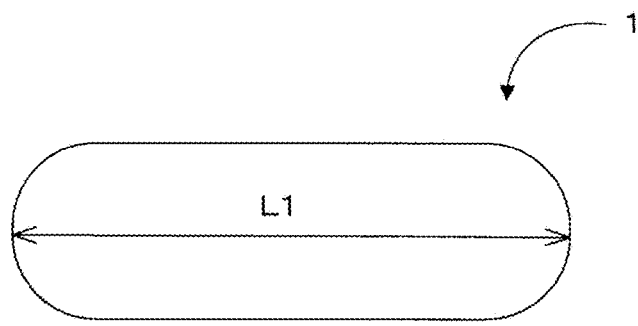
FIG. 2 is a schematic view schematically showing one example of a surface shape of the porous plate-shaped filler of the present invention.

As shown in FIG. 1, a porous plate-shaped filler 1 of the present invention is a plate shape having an aspect ratio of 3 or more, a surface shape is one of an oval and a round-corner polygonal shape, and its minimum length is from 0.1 to 50 μm. FIG. 1 shows the porous plate-shaped filler 1 of the present invention in which the surface shape is round. Furthermore, FIG. 2 shows that the surface shape of the porous plate-shaped filler 1 of the present invention is oval. Furthermore, FIG. 3 shows that the surface shape of the porous plate-shaped filler 1 of the present invention is a round-corner quadrangular shape which is a round-corner polygonal shape.

It is to be noted that in the present description, "the aspect ratio" is defined by a maximum length/the minimum length of the porous plate-shaped filler 1. Here, "the maximum length" is a length maximized when sandwiching a particle (the porous plate-shaped fillers 1) between a pair of parallel surfaces, and "the minimum length" is a length minimized when similarly sandwiching the particle between the pair of parallel surfaces, and corresponds to a so-called thickness in a case of a flat plate. For example, as shown in FIG. 1, in the porous plate-shaped filler 1 in which the surface shape of the plate is round, a length of a diameter of the round surface becomes a maximum length L1 and the thickness becomes a minimum length L2. It is to be noted that the surface shape of the porous plate-shaped filler 1 is a shape of the surface of a maximum area seen from a minimum length direction. In other words, the shape is a shape of a plan view in the minimum length direction. For example, in FIG. 1, a shape seen from above (A-direction) is the surface shape and is round.

Furthermore, in the porous plate-shaped filler 1 in which the surface shape of the plate is oval, i.e., oblong as shown in FIG. 2, the longest length of the oblong surface becomes the maximum length L1 and a thickness becomes the minimum length L2. Here, the oval is a shape including an oblong shape, an elliptic shape, an egg shape or the like.

Figure 3:
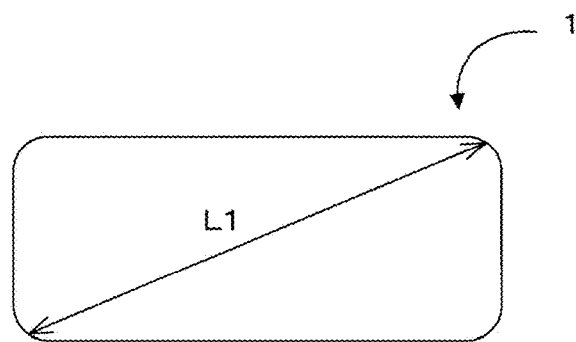
FIG. 3 is a schematic view schematically showing one example of another surface shape of the porous plate-shaped filler of the present invention.

Furthermore, in the round-corner quadrangular shape in which such a surface shape of the plate as shown in FIG. 3 is the round-corner polygonal shape, a length of a diagonal line of the quadrangular surface becomes the maximum length L1 and a thickness becomes the minimum length L2. The round-corner polygonal shape is a shape in which corners of a polygonal shape are rounded. It is preferable that the round-corner polygonal shape is a round-corner triangular shape, a round-corner quadrangular shape, a round-corner pentangular shape or the like. Furthermore, it is preferable that a radius R of an arc of the round-corner polygonal shape in the surface shape of the porous plate-shaped filler 1 is not less than the minimum length of the porous plate-shaped filler 1.

Figure 4:
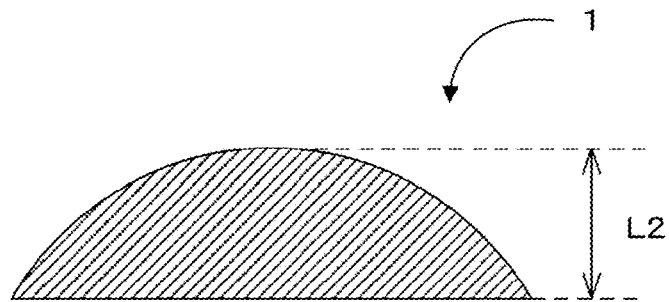
FIG. 4 is a cross-sectional view schematically showing one example of a cross section of the porous plate-shaped filler of the present invention.
Figure 5:
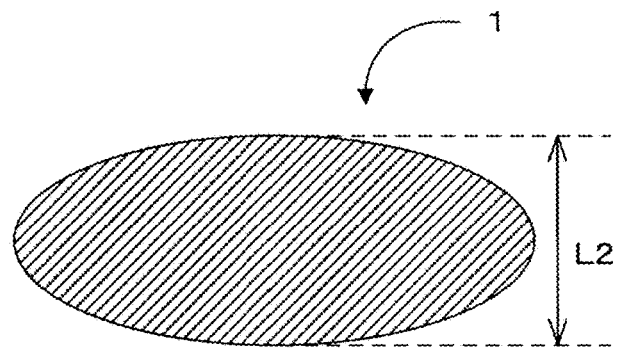
FIG. 5 is a cross-sectional view schematically showing another example of the cross section of the porous plate-shaped filler of the present invention.

"The plate shape" of the porous plate-shaped filler 1 includes not only a flat plate shape (the plate which is flat and does not curve) but also a curved plate shape and a plate shape having a thickness (the minimum length) which is not constant, as long as the aspect ratio is 3 or more and the minimum length L2 is from 0.1 to 50 μm. Among these shapes, it is preferable that a sectional shape of the porous plate-shaped filler 1 of the present invention is one of an arch shape, an elliptic shape, and a quadrangular shape in which at least a part of corners is rounded. The sectional shape is a shape of a cross section parallel to the minimum length direction. FIG. 1 shows a cross section by hatched lines. FIG. 4 is a cross-sectional view showing an embodiment in which the cross section of the porous plate-shaped filler 1 of the present invention has an arch shape. The arch shape is a curved shape which is convex in an upward direction, i.e., a curved shape warped as in an arch which is convex in the upward direction. Furthermore, FIG. 5 is a cross-sectional view showing an embodiment in which the cross section of the porous plate-shaped filler 1 of the present invention is elliptic.

Figure 6:
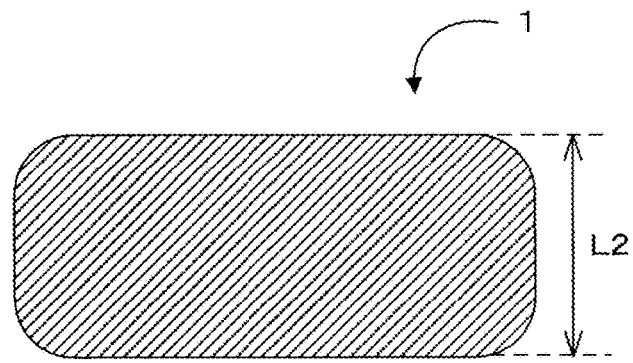
FIG. 6 is a cross-sectional view schematically showing still another example of the cross section of the porous plate-shaped filler of the present invention.

Furthermore, FIG. 6 is a cross-sectional view showing another example of the porous plate-shaped filler 1 of the present invention, and showing an embodiment of a round-corner quadrangular shape in which four corners are rounded, in a quadrangular shape in which at least a part of corners of a cross section is rounded. Furthermore, it is preferable that a radius R of an arc of the quadrangular shape in which at least a part of corners in the sectional shape is rounded is ⅕ or more of the minimum length of the porous plate-shaped filler 1.

Figure 7A:
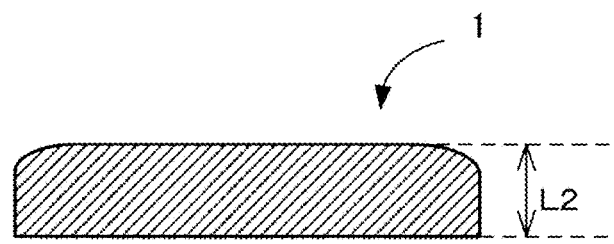
FIG. 7A is a cross-sectional view schematically showing a further example of the cross section of the porous plate-shaped filler of the present invention.
Figure 7B:
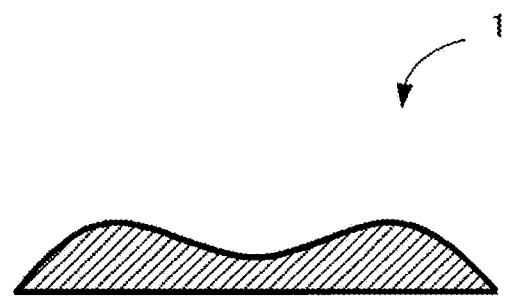
FIG. 7B is a cross-sectional view schematically showing a modification of an embodiment where the cross section of the porous plate-shaped filler of the present invention has a quadrangular shape in which at least a part of corners is rounded, which is an embodiment where a central portion is concaved.
Figure 7C:
FIG. 7C is a cross-sectional view schematically showing a modification of the embodiment where the cross section of the porous plate-shaped filler of the present invention has the quadrangular shape in which at least a part of corners are rounded, which is another embodiment where a central portion is concaved.

Furthermore, FIG. 7A is a cross-sectional view showing still another example of the porous plate-shaped filler 1 of the present invention, and showing an embodiment in which two corners of an upper bottom are rounded, in the quadrangular shape in which the at least a part of corners of the cross section is rounded. FIG. 7B is a cross-sectional view schematically showing an embodiment in which a central portion is concaved in the quadrangular shape in which there is rounded at least a part of corners of the cross section of the porous plate-shaped filler 1 of the present invention. FIG. 7C is a cross-sectional view schematically showing another embodiment in which a central portion is concaved in the quadrangular shape in which there is rounded at least a part of corners of the cross section of the porous plate-shaped filler 1 of the present invention. When forming the porous plate-shaped filler 1 by a method of dropping or discharging slurry, the embodiment shown in FIG. 7B or FIG. 7C might be obtained. Also in this case, when forming a heat insulation film 3, it is possible to obtain the heat insulation film in which the porous plate-shaped fillers 1 are easy to be laminated and a heat insulation effect improves.

It is preferable that the porous plate-shaped filler 1 includes pores having an average pore diameter of 10 to 500 nm. It is more preferable to include pores having an average pore diameter of 10 to 300 nm and it is further preferable to include pores having an average pore diameter of 10 to 100 nm. The smaller the average pore diameter of the pores which the porous plate-shaped filler 1 includes is, the lower a thermal conductivity preferably becomes. However, when the average pore diameter is smaller than 10 nm, there is the fear that producing cost increases. On the other hand, when the average pore diameter is in excess of 500 nm, there is the fear that the thermal conductivity excessively increases. It is to be noted that in the present description, "the average pore diameter" is a value measured by using a mercury porosimeter (mercury porosimetry). However, in a case where the average pore diameter is 10 nm or less, the diameter is measured by a gas adsorption method. The number of the pores to be included in one porous plate-shaped filler 1 may be one or plural, and the pores may be closed pores or open pores. When the porous plate-shaped filler 1 having such pores is included in the heat insulation film 3, the pores can improve the heat insulation effect.

A porosity of the porous plate-shaped filler 1 is preferably from 20 to 90%, more preferably from 20 to 80%, and further preferably from 40 to 70%. When the porous plate-shaped filler 1 having such a porosity is included in the heat insulation film 3, the pores can improve the heat insulation effect. When the porosity is adjusted into 20% or more, the pores increase and it is possible to decrease the thermal conductivity, and when the porosity is adjusted into 90% or less, it is possible to acquire strength.

It is to be noted that in the present description, "the porosity" is obtained by the following equation:

$$\text{Porosity (\%)} = (1 - (\text{apparent particle density}/\text{true density})) \times 100$$

In this equation, "the apparent particle density" is measured by a liquid immersion method using mercury. Furthermore, "the true density" is measured by pycnometry after sufficiently grinding the porous plate-shaped filler 1.

The minimum length of the porous plate-shaped filler 1 is from 0.1 to 50 μm, and is preferably 10 μm or less. When the minimum length of the porous plate-shaped filler 1 is short, the heat insulation film 3 including the porous plate-shaped fillers 1 can be made thin. That is, even in the thin heat insulation film 3, the heat insulation effect can improve.

The thermal conductivity of the porous plate-shaped filler 1 is preferably 1 W/(m·K) or less, more preferably 0.5 W/(m·K) or less, and further preferably 0.3 W/(m–K) or less. When the porous plate-shaped fillers 1 having such a thermal conductivity are included in the heat insulation film 3, the heat insulation effect can improve.

It is to be noted that in the present description, "the thermal conductivity" is obtained by the following equation:

$$\text{Thermal conductivity}(\text{W}/(\text{m·K})) = \text{thermal diffusivity} \times \text{specific heat} \times \text{density}$$

In this equation, "the thermal diffusivity" is measured by a light AC method. Furthermore, "the specific heat" is measured by a DSC method. "The density" is measured by the mercury porosimeter.

A heat capacity of the porous plate-shaped filler 1 is from 10 to 3000 kJ/(m³·K), more preferably from 10 to 2500 kJ/(m³·K), and further preferably from 10 to 2000 kJ/(m³·K). When the porous plate-shaped fillers 1 having the heat capacity of such a range are included in the heat insulation film 3, the heat insulation effect can improve.

It is to be noted that in the present description, "the heat capacity" is obtained by the following equation:

$$\text{Heat capacity}(\text{kJ}/(\text{m}^3 \cdot \text{K})) = \text{specific heat} \times \text{density}(\text{apparent particle density})$$

In this equation, "the specific heat" is measured by the DSC method. Furthermore, "the density (the apparent particle density)" is measured by the liquid immersion method using mercury. In the present description, the heat capacity is generally argued per unit volume called volume specific heat, and hence a unit is kJ/(m³·K).

It is preferable that the porous plate-shaped filler 1 includes particles having particle diameters of 1 nm to 10 μm. The particle may be a particle constituted of one crystal grain (a single crystalline particle) or a particle constituted of a large number of crystal grains (a polycrystalline particle). That is, it is preferable that the porous plate-shaped filler 1 is an aggregate of particles having particle diameters of this range. It is to be noted that for "the particle diameter" mentioned herein, a size of one particle of a particle group constituting a framework of the porous plate-shaped filler 1 (in the case of a spherical particle, the size is a diameter, and in another case, the size is a maximum diameter) is measured from an image of electron microscope observation. The particle diameter is more preferably from 1 nm to 5 μm and further preferably from 1 nm to 1 μm. When the porous plate-shaped filler 1 is included in the heat insulation film 3, the heat insulation effect can improve.

Examples of a material of the porous plate-shaped filler 1 include hollow glass beads, hollow ceramic beads, fly ash balloons, and hollow silica. Furthermore, the examples of the material include mesoporous silica, mesoporous titania, mesoporous zirconia, and Shirasu balloons.

The porous plate-shaped filler 1 preferably includes a metal oxide, and is further preferably constituted only of the metal oxide. In the metal oxide, as compared with a non-oxide (e.g., a carbide or a nitride) of a metal, ion bonding properties between the metal and oxygen are strong, and hence when the filler includes the metal oxide, the thermal conductivity is easy to decrease.

It is preferable that the metal oxide to be included in the porous plate-shaped filler 1 is an oxide of one selected from the group consisting of Zr, Y, Al, Si, Ti, Nb, Sr and La or a complex oxide of two or more selected from the group. When the metal oxide is the oxide or the complex oxide of these elements, heat conduction is hard to occur by lattice vibration (phonons) which is a main factor of the heat conduction.

Figure 8:
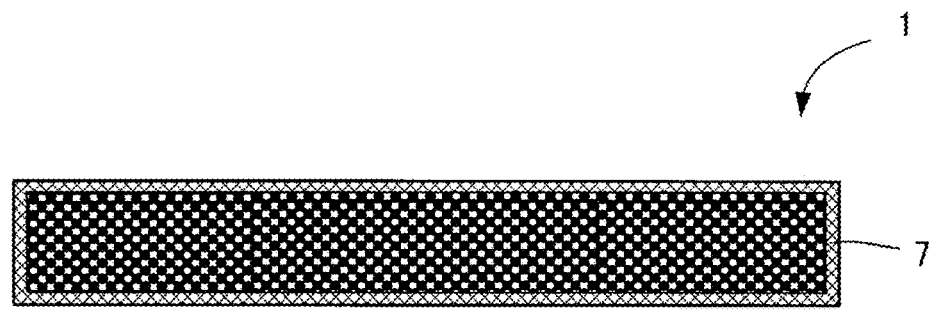
FIG. 8 is a cross-sectional view schematically showing a structure of the cross section of the porous plate-shaped filler of the present invention.

It is preferable that, as shown in FIG. 8, the porous plate-shaped filler 1 includes a coating layer 7 having a thickness of 1 nm to 1 μm in at least a part of its surface. Furthermore, the coating layer 7 is preferably a thermal resistance film to inhibit heat conduction and/or to reflect radiant heat. When the thermal resistance film having a thickness of several tens nm is formed on the surface of the porous plate-shaped filler 1, it is preferably possible to further decrease the thermal conductivity of the heat insulation film 3 including the porous plate-shaped fillers 1. The thermal resistance film may be any film as long as a material thereof is not the same as in the porous plate-shaped filler 1 to be coated, and the porous plate-shaped filler 1 is preferably coated with a different material from the porous plate-shaped filler. Even when the thermal resistance film is dense or porous, there is not any problem, but it is preferable that the film is dense. In the present description, when the porosity is smaller than 20%, the film is dense, and when the porosity is 20% or more, the film is porous. When the thermal resistance film is formed in a part of the surface of the porous plate-shaped filler 1, it is possible to obtain an effect of decreasing the thermal conductivity, but when the whole surface of the porous plate-shaped filler 1 is coated with the thermal resistance film, the effect of decreasing the thermal conductivity can further heighten.

2. Method for Producing Porous Plate-Shaped Filler

Next, a method for producing the porous plate-shaped filler 1 of the present invention will be described.

2-1. Producing Method 1

A producing method 1 using a laser processing machine will be described. The producing method 1 is a method of processing a green sheet 32 made from a material including a component of the porous plate-shaped filler 1 by use of a laser processing machine 35 capable of performing irradiation with laser at a pulse width of 10 picoseconds or less, before or after firing, to form the porous plate-shaped filler 1 having a predetermined surface shape. Examples of a method of forming the green sheet 32 including the component of the porous plate-shaped filler 1 include press molding, casting, extrusion, injection molding, tape forming, and a doctor blade method, and any method may be used. Hereinafter, there will be described, as an example, a case where the component of the porous plate-shaped filler 1 to be produced is ceramics and the green sheet 32 is formed by the doctor blade method.

First, a pore former, a binder, a plasticizer, a liquid medium and the like are added to ceramics powder to be mixed by a ball mill or the like, thereby preparing a green sheet forming slurry.

As the ceramics powder, there is usable zirconia powder, yttria partially stabilized zirconia powder, alumina powder, silica powder, mullite powder, spinel powder, magnesia powder, yttria powder, ceria powder, silicon carbide powder, silicon nitride powder, aluminum nitride powder or the like. As the pore former, there are usable latex particles, melamine resin particles, PMMA particles, polyethylene particles, polystyrene particles, a foamable resin, a water absorbable resin or the like. As the binder, there is usable polyvinyl butyral resin (PVB), polyvinyl alcohol resin, polyvinyl acetate resin, polyacrylic resin or the like. As the plasticizer, DBP (dibutyl phthalate), DOP (dioctyl phthalate) or the like is usable. As the liquid medium, xylene, 1-butanol or the like is usable.

It is preferable that the green sheet forming slurry is subjected to a vacuum defoaming treatment, thereby adjusting the viscosity into 100 to 10000 cps. Afterward, a film 31 such as a PET film is used as an article to be printed, and the green sheet 32 is formed on the film 31 by a doctor blade device so that a thickness of the fired green sheet is from 0.1 to 100 μm. It is to be noted that the surface of the film 31 is preferably coated with a mold release material such as silicone before forming the green sheet 32.

The green sheet 32 formed in this manner is processed by using the laser processing machine 35 so that a surface shape of a plate is a round shape, an oval such as an elliptic shape or an oblong shape, or a round-corner polygonal shape. Furthermore, it is preferable to use the laser processing machine 35 capable of performing the irradiation with the laser at the pulse width of 10 picoseconds or less.

Figure 9:
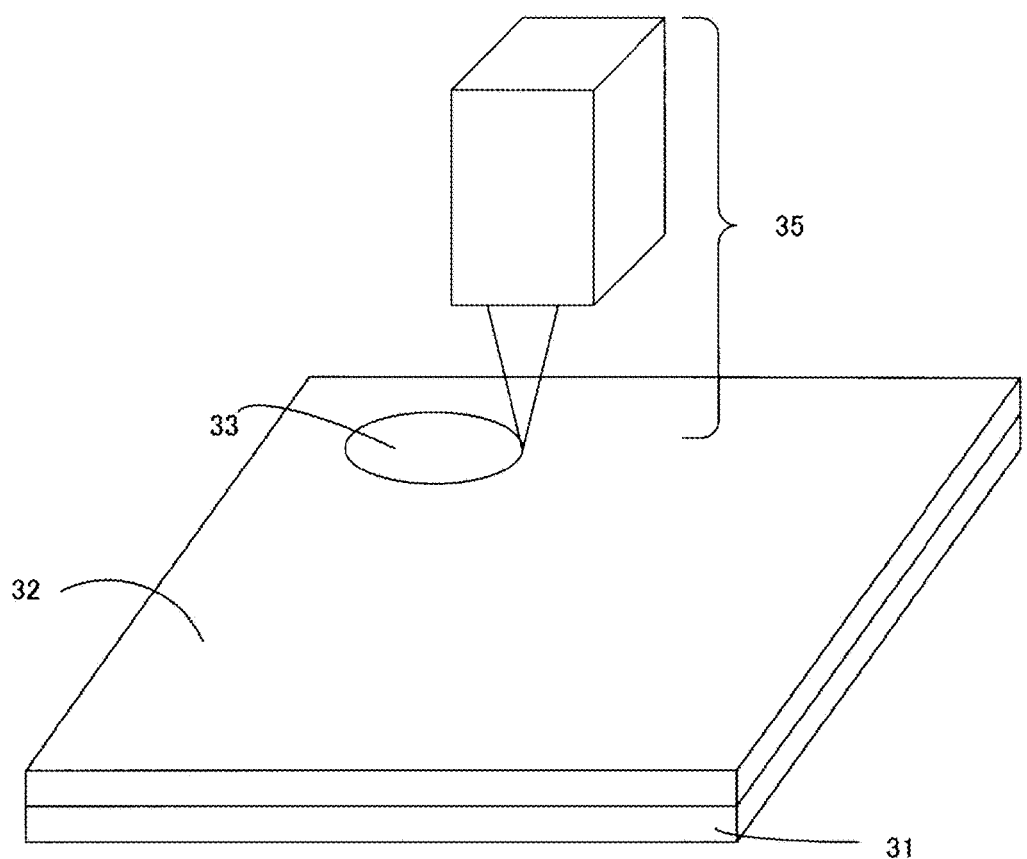
FIG. 9 is an explanatory view schematically showing a method 1 for producing the porous plate-shaped filler of the present invention.

FIG. 9 shows an example to process the green sheet 32 with the laser processing machine 35. In this case, the processing is performed by irradiating one surface of the green sheet 32 (the surface on a side opposite to a surface which is in contact with the film 31) with the laser from the laser processing machine 35. In this case, it is preferable that the pulse width of the laser for the irradiation is 10 picoseconds or less. When the pulse width is 10 picoseconds or less, during the processing, the green sheet 32 is not excessively heated, and melting (heat sagging) of the green sheet 32 is hard to occur.

After collecting a formed body 33 formed by such a method as described above, the formed body is mounted on a plate-shaped refractory member such as an alumina plate, and degreased when necessary, followed by the firing, to obtain a fired body in which a surface shape of the plate is a round shape, an oval such as an elliptic shape or an oblong shape, or a round-corner polygonal shape. It is possible to suitably determine firing conditions in accordance with a material of the green sheet 32, or the like. It is usually preferable to fire the green sheet 32 made from the material including the ceramics powder at a firing temperature of about 800 to 2300° C. for about 0.5 to 20 hours.

2-2. Producing Method 2

A producing method 2 of the porous plate-shaped filler 1 of the present invention is a method of dropping or discharging slurry 38 made from a material including a component of the porous plate-shaped filler 1 and adjusted into a viscosity of 100 to 10000 cps, to form the porous plate-shaped filler 1 whose sectional shape is one of an arch shape, an elliptic shape, and a quadrangular shape in which at least a part of corners is rounded. Furthermore, as a method of dropping or discharging the slurry 38, it is preferable to use an ink jet type spotter device 37. When using this method, a cross section of the porous plate-shaped filler 1 shown in FIG. 7A easily becomes a quadrangular shape in which at least a part of corners is rounded, or becomes a shape in which a central portion is concaved as shown in FIG. 7B and FIG. 7C.

Figure 10:
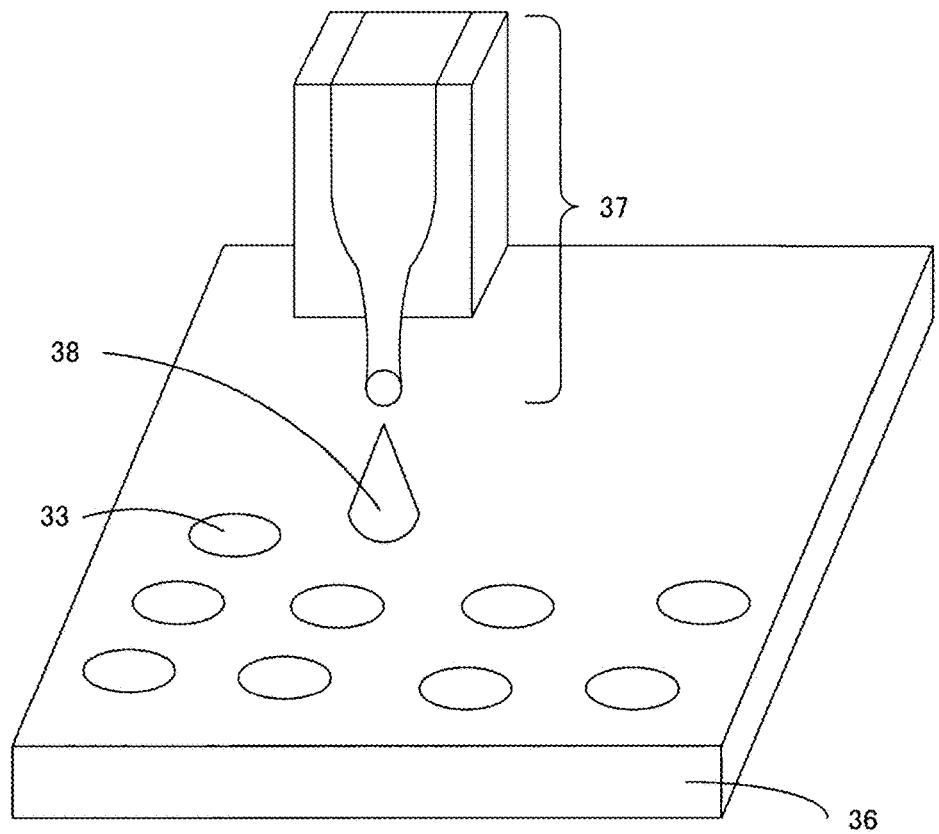
FIG. 10 is an explanatory view schematically showing a method 2 for producing the porous plate-shaped filler of the present invention.

FIG. 10 shows an example to drop the slurry 38 by use of the ink jet type spotter device 37. It is possible to control a maximum length and a minimum length of a filler shape in accordance with a nozzle diameter and an amount of the slurry to be dropped. At this time, the nozzle diameter becomes the maximum length. The nozzle diameter is adjusted so that the maximum length is from 30 to 300 μm, and the amount of the slurry to be dropped is adjusted so that the minimum length after the firing is from 0.1 to 50 μm and more preferably 10 μm or less, thereby dropping the slurry 38 to form the filler. A formed body 33 is mounted on a plate-shaped refractory member 36 such as an alumina plate, and degreased when necessary, followed by firing, thereby making it possible to obtain a fired body in which a surface shape of the plate is a round shape, an oval such as an elliptic shape or an oblong shape, or a round-corner polygonal shape.

2-3. Producing Method 3

A producing method 3 of the porous plate-shaped filler 1 of the present invention is a method of adhering, to an adhering portion 41 having a predetermined shape, slurry 38 made from a material including a component of the porous plate-shaped filler 1 and adjusted into a viscosity of 100 to 10000 cps, and pressing the adhering portion 41 onto a substrate surface 42, thereby adhering the slurry 38 adhered to the adhering portion 41 to the substrate surface 42, to form the porous plate-shaped filler 1 whose sectional shape is one of an arch shape, an elliptic shape, and a quadrangular shape in which at least a part of corners is rounded.

Figure 11:
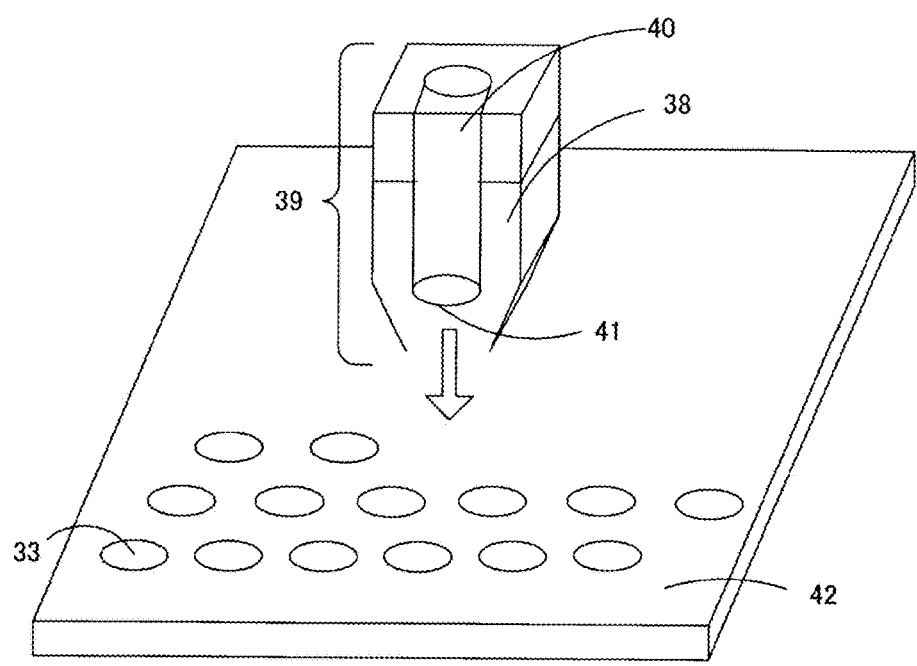
FIG. 11 is an explanatory view schematically showing a method 3 for producing the porous plate-shaped filler of the present invention.

After subjecting the slurry 38 including the component of the porous plate-shaped filler 1 to a vacuum defoaming treatment or adding a liquid medium (xylene or 1-butanol) to the slurry and adjusting a viscosity into 100 to 10000 cps, the slurry 38 is adhered to a tip portion which is the adhering portion 41 of a rod processed into a desirable shape, and the adhering portion is pressed onto the substrate surface 42 as it is to coat the substrate surface. As a coating method, it is preferable to use a needle type dispenser device 39. FIG. 11 shows a coating example using the needle type dispenser device 39. For the purpose of obtaining a porous plate-shaped filler fired body having a predetermined shape, it is preferable that the adhering portion 41 is formed to correspond to the above shape. For example, in a case of forming a surface shape of a plate into a round shape, the shape of the tip portion which is the adhering portion 41 is adjusted into the round shape. The surface is coated with the slurry so that the minimum length after firing is from 0.1 to 50 μm and more preferably 10 μm or less and the maximum length is from 30 to 300 μm. A formed body 33 obtained by coating the surface with the slurry is mounted on a plate-shaped refractory member 36 such as an alumina plate, and degreased when necessary, followed by the firing, thereby making it possible to obtain a fired body in which the surface shape of such a plate as shown in FIG. 1 is the round shape, an oval such as an elliptic shape or an oblong shape, or a round-corner polygonal shape.

3. Heat Insulation Film

Figure 12:
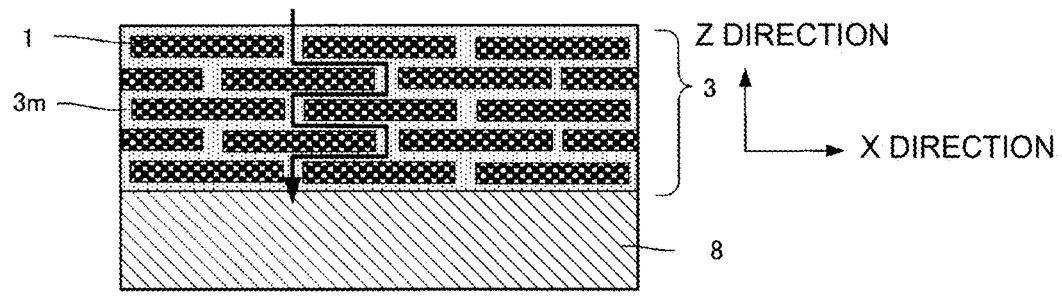
FIG. 12 is an explanatory view schematically showing one example of an embodiment of a heat insulation film.

Next, the heat insulation film 3 of the present invention will be described. The heat insulation film 3 of the present invention includes the porous plate-shaped fillers 1 of the present invention. Specifically, as shown in FIG. 12, in the heat insulation film 3 of the present invention, the porous plate-shaped fillers 1 of the present invention are dispersed and arranged in a matrix 3$m$ to bond the porous plate-shaped fillers 1. The matrix 3$m$ is a component which is present around the porous plate-shaped fillers 1 and between the particles of the fillers and bonds these particles to each other.

As shown in FIG. 12, in the heat insulation film 3 of the present invention, it is preferable that the porous plate-shaped fillers 1 are arranged (laminated) in the form of layers. The arrangement in the form of the layers mentioned herein indicates that the porous plate-shaped fillers are present in the matrix 3$m$ in a state close to a horizontal state when the fillers are superimposed on one another. It is to be noted that at this time, positions of the porous plate-shaped fillers 1 (a position of the center of gravity) do not have to be orderly periodically arranged in X, Y and Z-directions of the heat insulation film 3 (provided that the Z-direction is defined as the thickness direction), and there is not any problem even when the fillers are present at random. When the porous plate-shaped fillers 1 are laminated in the form of the layers in the heat insulation film 3, the heat transfer path deflects to lengthen as shown by an arrow in the drawing, and the heat insulation effect can improve. In particular, for the positions of the porous plate-shaped fillers 1, as shown in FIG. 12, the fillers preferably are not orderly arranged in the Z-direction (the fillers preferably shift alternately), because the heat transfer path more deflects to lengthen.

It is preferable that the heat insulation film 3 of the present invention includes at least one of ceramics, glass and resin as the matrix 3$m$. From the viewpoint of a heat resistance, ceramics or glass is more preferable. More specifically, examples of a material forming the matrix 3$m$ include silica, alumina, mullite, zirconia, titania, silicon nitride, acid silicon nitride, silicon carbide, acid silicon carbide, calcium silicate, calcium aluminate, calcium aluminosilicate, aluminum phosphate, potassium aluminosilicate, and glass. These materials are preferably amorphous from the viewpoint of the thermal conductivity. Alternatively, in a case where the material of the matrix 3$m$ is ceramics, the matrix is preferably an aggregate of particulates having particle diameters of 500 nm or less. When the aggregate of the particulates having the particle diameters of 500 nm or less is used as the matrix 3$m$, it is possible to further decrease the thermal conductivity. Furthermore, in a case where the material forming the matrix 3$m$ is a resin, types of resin specifically include a silicone resin, a polyimide resin, a polyamide resin, an acrylic resin, and an epoxy resin.

As shown by the arrow in FIG. 12, a matrix 3$m$ portion in which the thermal conductivity is high becomes a main heat transfer path, but the heat insulation film 3 of the present invention includes the porous plate-shaped fillers 1, and the heat transfer path makes more detours to a direction in which heat is not to be transferred (the film thickness direction). That is, a length of the heat transfer path increases, and hence it is possible to decrease the thermal conductivity. Furthermore, the porous plate-shaped fillers 1 are the plate shape, and hence, as compared with a case of using spherical fillers, a bonding area between the fillers increases. Further, as a result, strength of the whole heat insulation film 3 heightens, and erosion, peeling or the like is hard to occur.

In the heat insulation film 3, it is preferable that a porosity of the whole heat insulation film 3 is from 10 to 99%, a porosity of the porous plate-shaped filler 1 is from 20 to 90%, and a porosity of the matrix 3$m$ is from 0 to 70%.

In the heat insulation film 3 of the present invention, it is preferable that a thickness is from 1 μm to 5 mm. According to such a thickness, it is possible to obtain the heat insulation effect without adversely affecting characteristics of a substrate 8 coated with the heat insulation film 3. It is to be noted that the thickness of the heat insulation film 3 can suitably be selected in the above range in accordance with its use application.

In the heat insulation film 3 of the present invention, it is preferable that the thermal conductivity is 1 W/(m·K) or less and more preferably 0.5 W/(m·K) or less. The heat insulation film 3 has such a low thermal conductivity, thereby making it possible to inhibit the heat transfer and obtain a high heat insulation effect.

It is possible to form the heat insulation film 3 of the present invention by coating the substrate 8 with a coating composition and performing drying and/or a heat treatment. "The coating composition" mentioned herein is a composition including the porous plate-shaped filler aggregate of the present invention, and one or more selected from the group consisting of an inorganic binder, an inorganic polymer, oxide sol, and water glass. The coating composition may further include dense fillers, a viscosity modifier, a liquid medium, a dispersing agent and the like, in addition to the above component. Examples of specific substances to be included in the coating composition include cement, bentonite, aluminum phosphate, silica sol, alumina sol, boehmite sol, zirconia sol, titania sol, tetramethyl orthosilicate, tetraethyl orthosilicate, polysilazane, polycarbosilane, polyvinyl silane, polymethyl silane, polysiloxane, polysilsesquioxane, geopolymer, and sodium silicate.

It is possible to repeatedly perform the coating with the coating composition and the drying and/or the heat treatment when necessary, so that it is possible to form the thick heat insulation film 3. Alternatively, after forming the heat insulation film 3 on a virtual substrate, the virtual substrate is removed, thereby separately preparing the heat insulation film 3 singly formed into a thin plate, and the heat insulation film 3 may be adhesively bonded to or bonded to the substrate 8. Examples of a material of the substrate 8 include a metal, ceramics, glass, plastic, wood, cloth, and paper. In particular, examples of the substrate 8 made of the metal include iron, an iron alloy, stainless steel, aluminum, an aluminum alloy, a nickel alloy, a cobalt alloy, a tungsten alloy, and a copper alloy.

There is not any special restriction on the substrate (an article) 8 of a target of the forming (coating) of the heat insulation film 3. Example of the substrate suitably include an engine constituting member for a car or the like, a pipe, a wall of a building, and a heating cooker. It is to be noted that the heat insulation film of the present invention may directly be formed on the substrate, or may be formed on the substrate via one or more layers (films) having physical properties different from those of the heat insulation film of the present invention. Furthermore, the heat insulation film of the present invention may be used in a state of laminating, on the surface of the heat insulation film, one or more layers (films) having the physical properties different from those of the heat insulation film of the present invention.

EXAMPLES

Hereinafter, the present invention will be described in more detail on the basis of examples, but the present invention is not limited to these examples.

Example 1

To yttria partially stabilized zirconia powder, there were added carbon black as a pore former, polyvinyl butyral resin (PVB) as a binder, dioctyl phthalate (DOP) as a plasticizer, and xylene and 1-butanol as liquid mediums, followed by mixing in a ball mill for 30 hours, to prepare a green sheet forming slurry. After subjecting this slurry to a vacuum defoaming treatment or adding the liquid medium (xylene and 1-butanol) to the slurry to adjust a viscosity into 4000 cps, a green sheet 32 was formed to obtain a thickness of 5 µm (a design value) after firing, by a doctor blade device. The green sheet 32 was processed by using a laser processing machine 35 so that a surface shape of a plate was round. The laser processing machine 35 capable of performing irradiation with laser at a pulse width of 10 picoseconds or less was used, to process the green sheet at a frequency of 200 MPa and an output of 2.5 W. This formed green sheet aggregate was heated and degreased at 600° C. for 5 hours, followed by heating and firing at 1100° C. for two hours, thereby obtaining a fired body in which the surface shape of the plate was round and a sectional shape was a round-corner quadrangular shape. From the porous plate-shaped filler aggregate (powder of porous plate-shaped fillers) which was the fired body, 20 porous plate-shaped fillers 1 (particles) were optionally selected, to measure an average value of minimum lengths and an average value of maximum lengths, thereby, from the average values, measuring an average value of the aspect ratios. Table 1 shows the values. Additionally, a thermal conductivity of the porous plate-shaped fillers 1 was 0.2 W/(m·K), a heat capacity was 900 kJ/(m³·K), an average pore diameter was 150 nm, and a porosity was 65%.

Next, there was prepared a coating composition including the obtained porous plate-shaped filler aggregate, polysiloxane as a material of a matrix 3m and isopropyl alcohol, to coat aluminum alloy of a substrate, followed by drying and a heat treatment at 200° C., thereby forming a heat insulation film 3. In the formed heat insulation film 3, 10 or more porous plate-shaped fillers 1 were laminated in its thickness direction, and its thickness was about 100 µm. A thermal conductivity of the heat insulation film 3 was measured, and Table 2 shows the value.

Example 2

Figure 13:
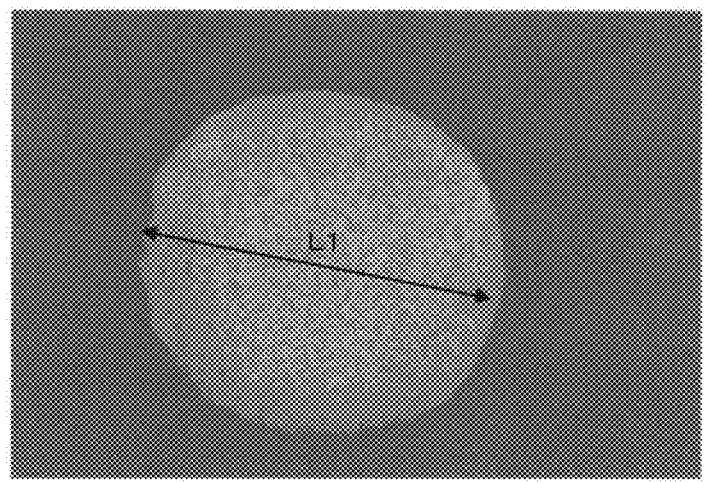
FIG. 13 is an electron microscopic photograph of a porous plate-shaped filler of Example 2.

A green sheet was formed to obtain a thickness of 10 µm (a design value) after firing. The other procedures were the same as in Example 1. FIG. 13 is an electron microscopic photograph of a porous plate-shaped filler 1 obtained in Example 2, and a length of a portion shown by arrows in the electron microscopic photograph of FIG. 13 is a maximum length L1 of the porous plate-shaped filler 1.

Example 3

A green sheet was formed to obtain a thickness of 25 µm (a design value) after firing. The other procedures were the same as in Example 1.

Example 4

Figure 14:
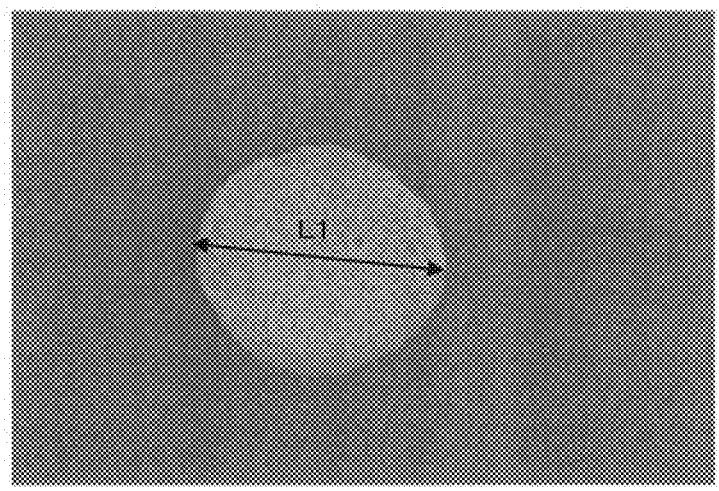
FIG. 14 is an electron microscopic photograph of a porous plate-shaped filler of Example 4.

The procedure of Example 1 was repeated to prepare slurry 38. By subjecting the slurry 38 to a vacuum defoaming treatment or adding a liquid medium (xylene and 1-butanol) to the slurry, a viscosity was adjusted into 1000 cps. Afterward, the slurry 38 was dropped to form a body by an ink jet type spotter device 37 so that after firing, a minimum length was 8 µm and a maximum length L1 was 60 µm. The procedure of Example 1 was repeated to degrease and fire a formed body 33 obtained by the dropping, thereby obtaining a fired body in which a surface shape of a plate was round and a sectional shape was an arch shape. The procedure of Example 1 was repeated to measure an average value of minimum lengths of porous plate-shaped fillers 1 and an average value of maximum lengths thereof, thereby, from the average values, measuring an average value of aspect ratios. Table 1 shows the values. Furthermore, a length of a portion shown by arrows in an electromicroscopic photograph of FIG. 14 is a maximum length L1 of the porous plate-shaped filler 1. Additionally, values of a thermal conductivity, a heat capacity, an average pore diameter and a porosity of the porous plate-shaped fillers 1 were the same as in Example 1. Furthermore, the procedure of Example 1 was repeated by using an obtained porous plate-shaped filler aggregate to form a heat insulation film 3. A thermal conductivity of the heat insulation film 3 formed in this manner was measured, and Table 2 shows the value.

Example 5

Figure 15:
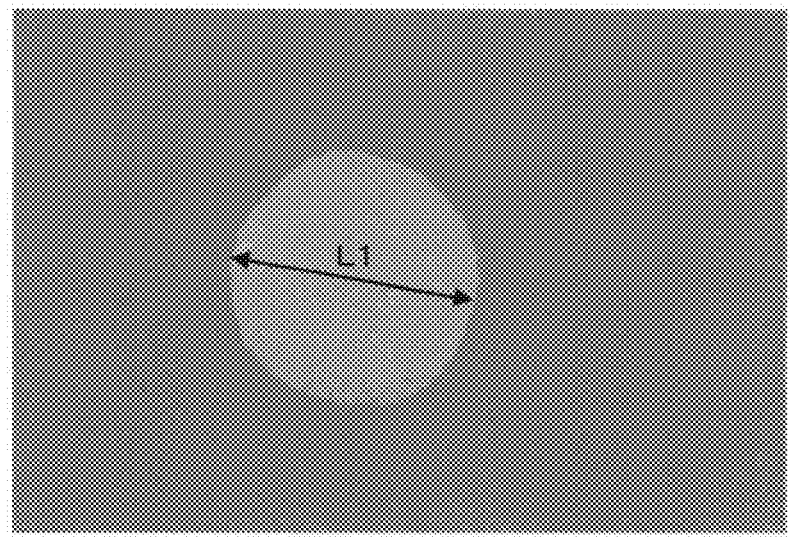
FIG. 15 is an electron microscopic photograph of a porous plate-shaped filler of Example 5.
Figure 16:
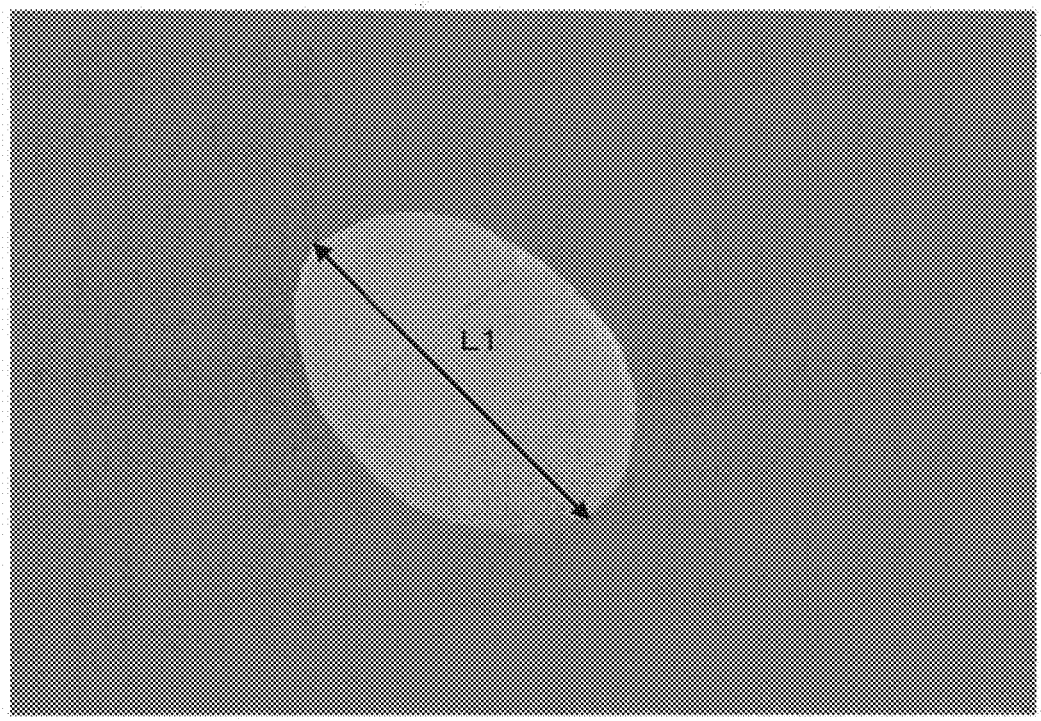
FIG. 16 is an electron microscopic photograph of a porous plate-shaped filler of Example 6.
Figure 17:
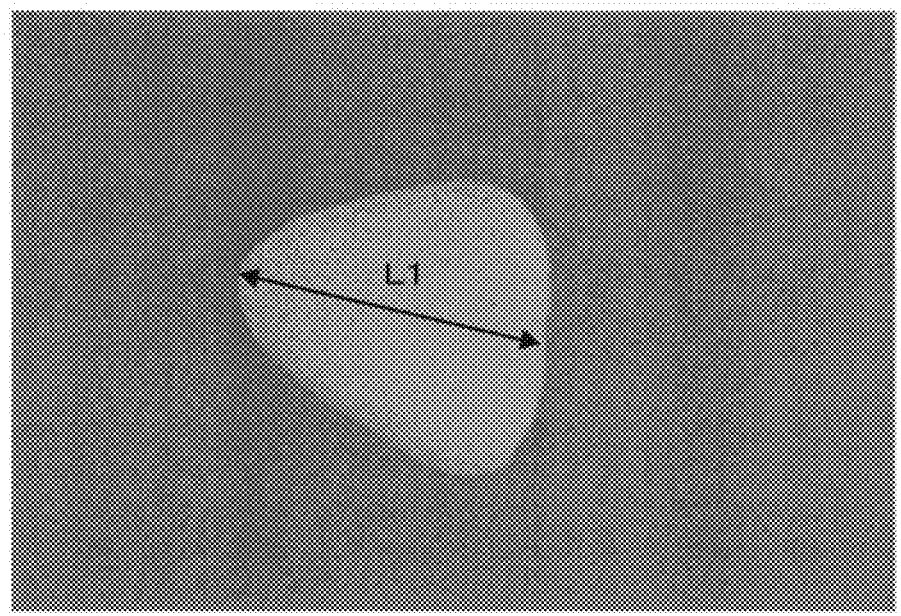
FIG. 17 is an electron microscopic photograph of a porous plate-shaped filler of Example 7.
Figure 18:
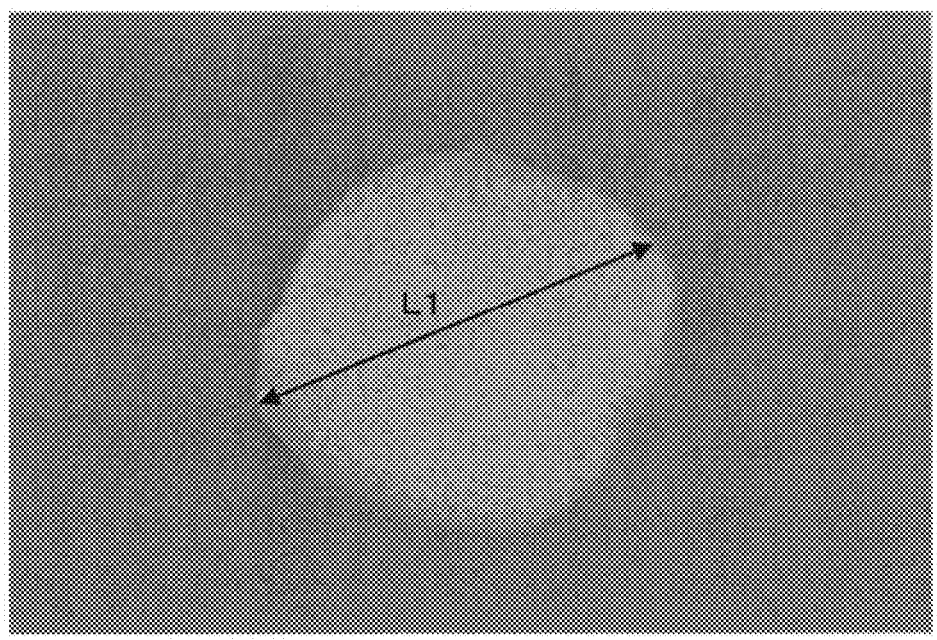
FIG. 18 is an electron microscopic photograph of a porous plate-shaped filler of Example 8.
Figure 19:
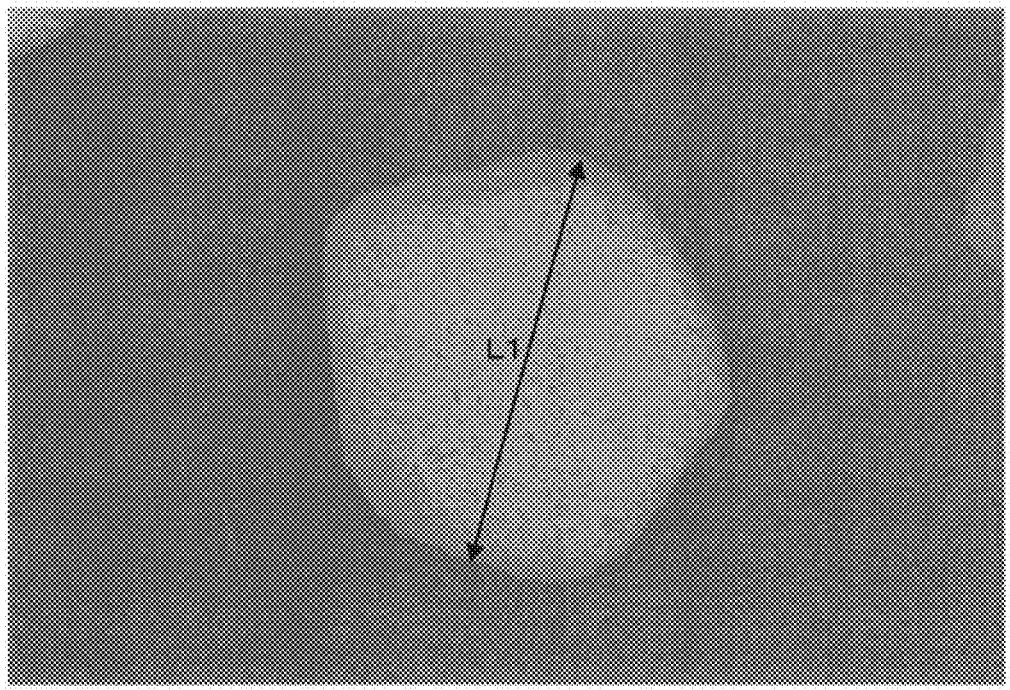
FIG. 19 is an electron microscopic photograph of a porous plate-shaped filler of Example 9.

The procedure of Example 1 was repeated to prepare slurry 38. By subjecting the slurry 38 to a vacuum defoaming treatment or adding a liquid medium (xylene and 1-butanol) to the slurry, a viscosity was adjusted into 2000 cps. Afterward, coating with the slurry 38 was performed by a needle type dispenser device 39 so that after firing, a minimum length was 9 μm and a maximum length was 60 μm. The procedure of Example 1 was repeated to degrease and fire a formed body 33 obtained by the coating, thereby obtaining a fired body in which a surface shape of a plate was round and a sectional shape was an arch shape. The procedure of Example 1 was repeated to measure an average value of minimum lengths of porous plate-shaped fillers 1 and an average value of maximum lengths thereof, thereby, from the average values, measuring an average value of aspect ratios. Table 1 shows the values. Furthermore, a length of a portion shown by arrows in an electron microscopic photograph of FIG. 15 is a maximum length L1 of the porous plate-shaped filler 1. Additionally, values of a thermal conductivity, a heat capacity, an average pore diameter and a porosity of the porous plate-shaped fillers 1 were the same as in Example 1. Furthermore, the procedure of Example 1 was repeated by using an obtained porous plate-shaped filler aggregate to form a heat insulation film 3. A thermal conductivity of the heat insulation film 3 formed in this manner was measured, and Table 2 shows the value.

Examples 6 to 9

The procedure of Example 5 was repeated to prepare slurry 38, and coating with the slurry was performed by a needle type dispenser device 39. By changing a shape of an adhering portion 41 of a needle 40, it was possible to change a shape of a porous plate-shaped filler 1. Table 1 shows surface shapes of the porous plate-shaped fillers 1 of Examples 6 to 9. The procedure of Example 1 was repeated to degrease and fire each formed body 33, thereby obtaining a fired body having a plate surface shape shown in Table 1. The procedure of Example 1 was repeated to measure an average value of minimum lengths of the porous plate-shaped fillers 1 and an average value of maximum lengths thereof, thereby, from the average values, measuring an average value of aspect ratios. Table 1 shows the values. Furthermore, a length of a portion shown by arrows in an electron microscopic photograph of each of FIG. 16 to FIG. 19 is a maximum length L1 of the porous plate-shaped filler 1. Additionally, values of a thermal conductivity, a heat capacity, an average pore diameter and a porosity of the porous plate-shaped fillers 1 were the same as in Example 1. Furthermore, the procedure of Example 1 was repeated by using each obtained porous plate-shaped filler aggregate to form a heat insulation film 3. A thermal conductivity of the heat insulation film 3 formed in this manner was measured, and Table 2 shows the value.

Comparative Example 1

Figure 20:
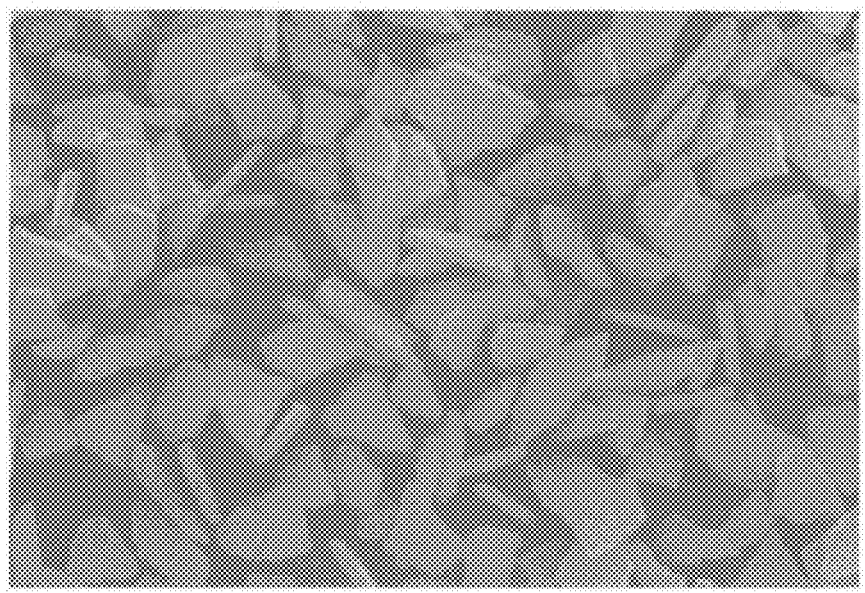
FIG. 20 is an electron microscopic photograph of a porous plate-shaped filler of Comparative Example 1.
Figure 21:
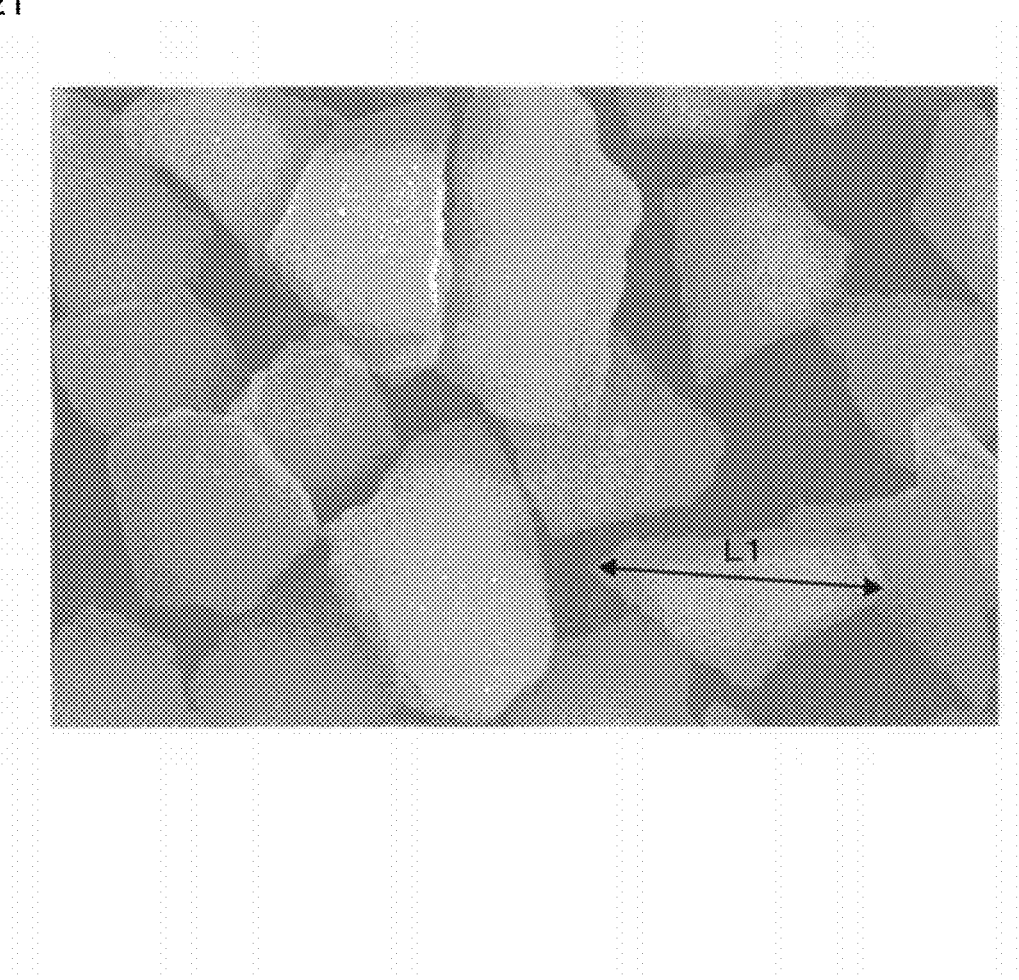
FIG. 21 is another electron microscopic photograph of the porous plate-shaped filler of Comparative Example 1.

The procedure of Example 1 was repeated to form a green sheet 32. After heating and degreasing the green sheet 32 at 600° C. for 5 hours, the green sheet was heated and fired at 1100° C. for 2 hours, to obtain a sheet-shaped fired body. This sheet-shaped fired body was placed on a metal net of a sieve having an aperture of 75 μm, and a rubber spatula was pressed onto the fired body to grind the body. Afterward, powder was classified by using sieves having apertures of 40 μm and 63 μm, respectively. The procedure of Example 1 was repeated to measure an average value of minimum lengths of the porous plate-shaped fillers 1 and an average value of maximum lengths thereof, thereby, from the average values, measuring an average value of aspect ratios. Table 1 shows the values. Furthermore, FIG. 20 and FIG. 21 show electron microscopic photographs of the obtained porous plate-shaped fillers. A length of a portion shown by arrows in the electron microscopic photograph of FIG. 21 is a maximum length L1 of the porous plate-shaped filler 1. A thermal conductivity of the porous plate-shaped fillers 1 was 0.2 W/(m·K), a heat capacity was 900 kJ/(m$^3$·K), an average pore diameter was 150 nm, and a porosity was 65%. Furthermore, the procedure of Example 1 was repeated by using an obtained porous plate-shaped filler aggregate to form a heat insulation film 3. A thermal conductivity of the heat insulation film 3 formed in this manner was measured, and Table 2 shows the value.

TABLE 1

| | Filler shape | | | Producing method | | | Fired filler | | | |
| --- | --- | --- | --- | --- | --- | --- | --- | --- | --- | --- |
| | Shape | Surface shape of plate | Sectional shape of plate | Processing target | Method | Device | Minimum length [μm] | Maximum length [μm] | Aspect ratio | Porosity [%] |
| Example 1 | Plate | Round | Round-corner quadrangular | Green sheet | Cutting | Laser processing machine | 4.6 | 80.3 | 17.5 | 65 |
| Example 2 | Plate | Round | Round-corner quadrangular | Green sheet | Cutting | Laser processing machine | 9 | 80.5 | 8.9 | 65 |
| Example 3 | Plate | Round | Round-corner quadrangular | Green sheet | Cutting | Laser processing machine | 23.3 | 80.6 | 3.5 | 65 |
| Example 4 | Plate | Round | Arch | Slurry (viscosity of 1000 cps) | Dropping (60pl) | Ink jet type spotter | 7.9 | 61.3 | 7.8 | 65 |
| Example 5 | Plate | Round | Arch | Slurry (viscosity of 2000 cps) | Coating (40pl) | Needle type dispenser | 9.2 | 60.1 | 6.5 | 65 |
| Example 6 | Plate | Elliptic | Round-corner quadrangular | Slurry (viscosity of 2000 cps) | Coating (40pl) | Needle type dispenser | 9.1 | 61.5 | 6.8 | 65 |
| Example 7 | Plate | Round-corner triangular | Round-corner quadrangular | Slurry (viscosity of 2000 cps) | Coating (13pl) | Needle type dispenser | 9.1 | 60.8 | 6.7 | 65 |

TABLE 1-continued

| | Filler shape | | | Producing method | | | Fired filler | | | |
|---|---|---|---|---|---|---|---|---|---|---|
| | Shape | Surface shape of plate | Sectional shape of plate | Processing target | Method | Device | Minimum length [μm] | Maximum length [μm] | Aspect ratio | Porosity [%] |
| Example 8 | Plate | Round-corner quadrangular | Round-corner quadrangular | Slurry (viscosity of 2000 cps) | Coating (25pl) | Needle type dispenser | 8.9 | 61.3 | 6.9 | 65 |
| Example 9 | Plate | Round-corner pentangular | Round-corner quadrangular | Slurry (viscosity of 2000 cps) | Coating (40pl) | Needle type dispenser | 9 | 61.4 | 6.8 | 65 |
| Comparative Example 1 | Plate | Polygonal | Quadrangular | Fired body | Grinding/ classifying | Grinder/ sieve classifier | 9 | 81.5 | 9.1 | 65 |

TABLE 2

| | Heat insulation film | | |
|---|---|---|---|
| | Matrix material | Thickness [μm] | Thermal conductivity [W/(m · K)] |
| Example 1 | Polysiloxane | 100 | 0.4 |
| Example 2 | Polysiloxane | 100 | 0.7 |
| Example 3 | Polysiloxane | 100 | 0.9 |
| Example 4 | Polysiloxane | 100 | 0.6 |
| Example 5 | Polysiloxane | 100 | 0.7 |
| Example 6 | Polysiloxane | 100 | 0.6 |
| Example 7 | Polysiloxane | 100 | 0.8 |
| Example 8 | Polysiloxane | 100 | 0.6 |
| Example 9 | Polysiloxane | 100 | 0.6 |
| Comparative Example 1 | Polysiloxane | 100 | 1.1 |

As described above, Comparative Example 1 was a porous plate-shaped filler 1 in which a surface shape was polygonal and a sectional shape was quadrangular, and hence a thermal conductivity of a heat insulation film 3 increased as compared with the examples. Specifically, in the heat insulation film 3 including the porous plate-shaped fillers 1 in which a surface shape of a plate was one of a round shape, an oval, and a round-corner polygonal shape, it was possible to decrease the thermal conductivity as compared with the heat insulation film 3 including plate-shaped fillers in which a surface shape was polygonal.

In the case of the porous plate-shaped filler 1 having edges of a polygonal shape as in Comparative Example 1, even when a volume ratio of the low thermal conductivity porous plate-shaped filler 1 is to be increased, the fillers are hard to be horizontally laminated due to the edges of these fillers, and a large number of clearances are present. Further, the matrix 3m is introduced into this portion, or the portion remains as a void. In a case of introducing the matrix 3m, a ratio of the matrix 3m (a highly thermally conductive component) in the heat insulation film 3 increases, and hence there is the tendency that the thermal conductivity of the heat insulation film 3 heightens. In a case where the clearance remains as the void, the void does not become a heat transfer path, and hence the thermal conductivity of the heat insulation film 3 decreases, but there is less matrix 3m to bond the fillers to each other, and it is not possible to sufficiently obtain strength. On the other hand, in the case of the porous plate-shaped filler 1 in which a surface shape of a plate is one of a round shape, an oval, and a round-corner polygonal shape and a sectional shape is one of an arch shape, an elliptic shape, and a quadrangular shape in which at least a part of corners is rounded, the fillers are the plate shape and are therefore easy to be arranged in the form of layers, and the fillers have less edges and are therefore easy to be horizontally laminated. Therefore, without making any wasteful voids, it is possible to increase the volume ratio of the porous plate-shaped fillers 1. Therefore, when the porous plate-shaped fillers 1 are included in the heat insulation film 3, a heat insulation effect in a thickness direction can improve. Even when the matrix 3m entering into a portion between the porous plate-shaped fillers 1 decreases, a mutual adhesive area of the porous plate-shaped fillers 1 via the matrix 3m is large, and hence it is possible to sufficiently obtain the strength.

INDUSTRIAL APPLICABILITY

The present invention is suitably usable for a porous plate-shaped filler to improve a heat insulation effect of an engine constituting member for a car or the like, a pipe, a wall of a building, a heating cooker or the like, a method for producing the porous plate-shaped filler, and a heat insulation film.

DESCRIPTION OF REFERENCE NUMERALS

1: porous plate-shaped filler, 3: heat insulation film, 3m: matrix, 7: coating layer, 8: substrate, 31: film, 32: green sheet, 33: formed body, 35: laser processing machine; 36: refractory member, 37: ink jet type spotter device, 38: slurry, 39: needle type dispenser device, 40: needle, 41: adhering portion, and 42: substrate surface.

The invention claimed is:

1. A heat insulation film comprising a porous plate-shaped filler which is a plate shape having major surfaces each of which contains a plurality of pores, a thickness of from 0.1 to 50 μm, a length to thickness aspect ratio of 3 or more and in which a surface shape is a round-corner polygonal shape, wherein a radius R of an arc of the round-corner polygonal shape in the surface shape is not less than the thickness, wherein a thermal conductivity of the heat insulation film is 1 W/(m·K) or less.

2. The heat insulation film according to claim 1, wherein the porous plate-shaped filler has a cross-sectional shape parallel to a thickness direction thereof that is one of an arch shape, an elliptic shape, and a quadrangular shape in which at least a part of corners is rounded.

3. The heat insulation film according to claim 2, wherein the porous plate-shaped filler has a radius R of an arc of the quadrangular shape in which at least a part of corners in the cross-sectional shape parallel to the thickness direction is rounded is 1/5 or more of the thickness.

4. The heat insulation film according to claim 1, wherein the porous plate-shaped filler includes pores having an average pore diameter of 10 to 500 nm.

5. The heat insulation film according to claim 1, wherein a thermal conductivity of the porous plate-shaped filler is 1 W/(m·K) or less.

6. The heat insulation film according to claim 1, wherein a heat capacity of the porous plate-shaped filler is from 10 to 3000 kJ/(m$^3$·K) or less.

7. A method for producing the heat insulation film according to claim 1, which comprises processing a green sheet made from a material including a component of the porous plate-shaped filler by use of a laser processing machine capable of performing irradiation with laser at a pulse width of 10 picoseconds or less, before or after firing, to form the porous plate-shaped filler having a predetermined surface shape.

8. A method for producing the heat insulation film according to claim 1, which comprises dropping or discharging slurry made from a material including a component of the porous plate-shaped filler and adjusted into a viscosity of 100 to 10000 cps, to form the porous plate-shaped filler whose cross-sectional shape parallel to a thickness direction thereof is one of an arch shape, an elliptic shape, and a quadrangular shape in which at least a part of corners is rounded.

9. The method for producing the heat insulation film according to claim 8, which comprises dropping or discharging the slurry by use of an ink jet type spotter device.

10. A method for producing the heat insulation film according to claim 1, which comprises adhering, to an adhering portion having a predetermined shape, slurry made from a material including a component of the porous plate-shaped filler and adjusted into a viscosity of 100 to 10000 cps; and pressing the adhering portion onto a substrate surface, thereby adhering the slurry adhered to the adhering portion to the substrate surface, to form the porous plate-shaped filler whose cross-sectional shape parallel to a thickness direction thereof is one of an arch shape, an elliptic shape, and a quadrangular shape in which at least a part of corners is rounded.

11. The method for producing the heat insulation film according to claim 10, which comprises adhering the slurry to the substrate surface by use of a needle type dispenser device.

12. The heat insulation film according to claim 1, wherein the porous plate-shaped fillers are arranged in the form of layers.

13. The heat insulation film according to claim 1, wherein a thickness of the heat insulation film is from 1 µm to 5 mm.

* * * * *

UNITED STATES PATENT AND TRADEMARK OFFICE
CERTIFICATE OF CORRECTION

PATENT NO. : 10,464,287 B2  
APPLICATION NO. : 15/297429  
DATED : November 5, 2019  
INVENTOR(S) : Akinobu Oribe et al.

Page 1 of 1

It is certified that error appears in the above-identified patent and that said Letters Patent is hereby corrected as shown below:

On the Title Page

Assignee, Item (73):
Please change: "Assignee: NKG Insulators, Ltd., Nagoya (JP)" to -- Assignee: NGK Insulators, Ltd., Nagoya (JP) --

Signed and Sealed this  
Fourteenth Day of January, 2020

Andrei Iancu  
*Director of the United States Patent and Trademark Office*